United States Patent
Kumar et al.

(10) Patent No.: US 10,758,996 B2
(45) Date of Patent: Sep. 1, 2020

(54) APPARATUS AND METHODS FOR PROVIDING THERMAL ENERGY TO AN ARTICLE

(71) Applicant: ROLLS-ROYCE plc, London (GB)

(72) Inventors: Sandeep Kumar, Singapore (SG); Nicholas Weeks, Derby (GB); Ming J. Tan, Singapore (SG); Iulian Marinescu, Singapore (SG)

(73) Assignee: ROLLS-ROYCE plc, London (GB)

( * ) Notice: Subject to any disclaimer, the term of this patent is extended or adjusted under 35 U.S.C. 154(b) by 56 days.

(21) Appl. No.: 15/904,583

(22) Filed: Feb. 26, 2018

(65) Prior Publication Data

US 2018/0243859 A1   Aug. 30, 2018

(30) Foreign Application Priority Data

Feb. 28, 2017   (GB) .................................. 1703182.4

(51) Int. Cl.
| | | |
|---|---|---|
| *B23K 20/00* | (2006.01) | |
| *B23K 20/22* | (2006.01) | |
| *H05B 3/00* | (2006.01) | |
| *H05B 3/34* | (2006.01) | |
| *B23K 20/12* | (2006.01) | |
| *B29C 73/34* | (2006.01) | |

(52) U.S. Cl.
CPC .......... *B23K 20/22* (2013.01); *B23K 20/1205* (2013.01); *H05B 3/0057* (2013.01); *H05B 3/0061* (2013.01); *H05B 3/34* (2013.01); *B29C 73/34* (2013.01)

(58) Field of Classification Search
CPC .... B23K 20/22; B23K 20/1205; B23K 37/00; B23K 20/26; B23K 20/24; B29C 73/34; H05B 3/34; H05B 3/0061; H05B 3/0057; H05B 3/10; H05B 3/00; H05B 1/023; H05B 3/36
See application file for complete search history.

(56) References Cited

U.S. PATENT DOCUMENTS 3,627,989 A * 12/1971 Heidler ................ H05B 3/0057
                                                                    219/553
4,320,253 A    3/1982 Fisher
(Continued)

FOREIGN PATENT DOCUMENTS

| CN | 201422174 | * | 3/2010 |
| CN | 102984833 A | * | 3/2013 |

(Continued)

OTHER PUBLICATIONS

Machine translation of CN-201422174 (no date available).*

(Continued)

*Primary Examiner* — Kiley S Stoner
(74) *Attorney, Agent, or Firm* — Shumaker & Sieffert, P.A.

(57) ABSTRACT

Apparatus for providing thermal energy to an article, the apparatus comprising: a first flexible heater configured to emit infrared radiation; and a first flexible member comprising a material configured to absorb the infrared radiation emitted by the first flexible heater and to generate thermal energy from the absorbed infrared radiation, the first flexible member being configured to transfer the generated thermal energy to the article through thermal conduction.

19 Claims, 9 Drawing Sheets

(56) References Cited

U.S. PATENT DOCUMENTS

| | | | | | |
|---|---|---|---|---|---|
| 5,302,230 | A | * | 4/1994 | Ino | C23C 16/56 |
| | | | | | 117/92 |
| 5,350,927 | A | * | 9/1994 | Rakhimov | A61L 2/08 |
| | | | | | 219/411 |
| 5,388,177 | A | * | 2/1995 | Ono | A61L 9/03 |
| | | | | | 392/386 |
| 5,559,924 | A | * | 9/1996 | Kadotani | F24H 1/142 |
| | | | | | 392/483 |
| 5,867,630 | A | * | 2/1999 | Kreuter | H01K 1/00 |
| | | | | | 219/553 |
| 2005/0100331 | A1 | * | 5/2005 | Konishi | F26B 3/30 |
| | | | | | 392/407 |
| 2006/0052849 | A1 | | 3/2006 | Docherty et al. | |
| 2009/0127478 | A1 | * | 5/2009 | Inoue | G01J 3/108 |
| | | | | | 250/504 R |
| 2009/0274454 | A1 | * | 11/2009 | Aderhold | H01L 21/324 |
| | | | | | 392/416 |
| 2017/0309543 | A1 | * | 10/2017 | Aoki | B32B 9/00 |
| 2019/0174580 | A1 | * | 6/2019 | Gaab | H05B 3/12 |
| 2019/0206671 | A1 | * | 7/2019 | Zissing | H01K 1/10 |
| 2019/0232076 | A1 | * | 8/2019 | Chiu | A61N 5/0613 |

FOREIGN PATENT DOCUMENTS

| | | | | | |
|---|---|---|---|---|---|
| CN | 104342546 | | | 2/2015 | |
| CN | 105962704 | A | * | 9/2016 | |
| CN | 106993344 | A | * | 7/2017 | |
| CN | 107708233 | A | * | 2/2018 | |
| DE | 2007388 | A1 | | 9/1971 | |
| DE | 3316569 | A1 | | 4/1984 | |
| DE | 4201944 | A1 | * | 8/1992 | F24H 1/142 |
| DE | 102013101082 | A1 | | 8/2014 | |
| EP | 1978112 | | | 10/2008 | |
| FR | 2950079 | A1 | | 3/2011 | |
| GB | 2014830 | A | | 8/1979 | |
| JP | 63276536 | A | * | 11/1988 | |
| JP | 2000012193 | A | * | 1/2000 | |
| JP | 2006286222 | A | * | 10/2006 | |
| KR | 20120133233 | A | * | 12/2012 | |
| KR | 101231678 | B1 | * | 2/2013 | |
| KR | 20180002343 | A | * | 1/2018 | |
| WO | WO-2019037385 | A1 | * | 2/2019 | |

OTHER PUBLICATIONS

Mchine translation of DE3316569A1 (no date available).*
Machine translation of CN-102984833A (no date available).*
Machine translation of CN-105962704A (no date available).*
Great Britain Search Report dated Jan. 16, 2018 issued in GB Patent Application No. 1703182.4.
Extended Search Report from counterpart European Application No. 18155479.1, dated Jul. 20, 2018, 9 pp.

* cited by examiner

APPARATUS AND METHODS FOR PROVIDING THERMAL ENERGY TO AN ARTICLE

CROSS-REFERENCE TO RELATED APPLICATIONS

This specification is based upon and claims the benefit of priority from UK Patent Application Number 1703182.4 filed on 28 Feb. 2017, the entire contents of which are incorporated herein by reference.

TECHNOLOGICAL FIELD

The present disclosure concerns apparatus and methods for providing thermal energy to an article.

BACKGROUND

Welding is a process that joins components together and may be used in the manufacture or repair of an article. For example, in the oil and gas industry, welding may be used to join steel pipes to one another. By way of another example, linear friction welding may be used to join a disk and a plurality of aerofoils to form a bladed disk (commonly referred to as a Blisk).

Welding may cause residual stress in the article due to: heat flowing from the weld area that causes the joint to expand; thermal expansion and contraction that leaves permanent stress; tensile residual stress that exists in the weld metal and the adjacent base metal; and compressive residual stress that exists away from the weld metal. The residual stress may result in cracks arising in the article without any external loads being applied when the article is in a hostile environment (for example, a high temperature environment).

BRIEF SUMMARY

According to various examples there is provided apparatus for providing thermal energy to an article, the apparatus comprising: a first flexible heater configured to emit infrared radiation; and a first flexible member comprising a material configured to absorb the infrared radiation emitted by the first flexible heater and to generate thermal energy from the absorbed infrared radiation, the first flexible member being configured to transfer the generated thermal energy to the article through thermal conduction.

The first flexible heater may define a first surface and a second surface. The first surface may be opposite to the second surface. The first flexible member may be coupled to the first surface of the first flexible heater.

The first flexible heater may include a first flexible tube defining a cavity, and a first flexible elongate heater positioned within the cavity of the first flexible tube.

The first flexible heater may include a second flexible elongate heater positioned within the cavity of the first flexible tube.

The apparatus may further comprise a controller configured to control the first flexible elongate heater to emit infrared radiation and to control the second flexible elongate heater to emit infrared radiation.

The controller may be configured to control the first flexible elongate heater to emit infrared radiation having a first amplitude, and to control the second flexible elongate heater to emit infrared radiation having a second amplitude, different to the first amplitude, to provide a predetermined heating profile.

The apparatus may further comprise a second flexible heater configured to emit infrared radiation.

The second flexible heater may define a first surface and a second surface. The first surface may be opposite to the second surface. The first flexible member may be coupled to the first surface of the second flexible heater.

The apparatus may further comprise a controller configured to control the first flexible heater and the second flexible heater to emit infrared radiation.

The controller may be configured to control the first flexible heater to emit infrared radiation having a first amplitude, and to control the second flexible heater to emit infrared radiation having a second amplitude, different to the first amplitude, to provide a predetermined heating profile.

The apparatus may further comprise a temperature sensor arrangement configured to sense one or more temperatures of the article.

The material of the first flexible member may comprise silicone rubber.

The apparatus may further comprise a second flexible member arranged to thermally insulate the first flexible heater.

The apparatus may further comprise a thermally conductive paint applied to a portion of the first flexible member. The thermally conductive paint may be arranged to increase the thermal energy generated at the portion.

The first flexible heater may be configured to emit infrared radiation having a wavelength band in the range of 780 nm to 1400 nm.

The article may be an aerospace component.

According to various examples there is provided a method of providing thermal energy to an article, the method comprising: providing an article; and providing an apparatus as described in the preceding paragraphs; and positioning the apparatus in contact with at least a part of the article to enable the apparatus to conductively transfer thermal energy to at least the part of the article.

The method may further comprise: determining a heating profile for the apparatus to enable the apparatus to provide varying thermal energy across the part of the article.

The method may further comprise performing a welding operation on a portion of the article prior to positioning the apparatus in contact with the article.

The method may further comprise: removing the apparatus from the article; and performing a welding operation on the article subsequent to removing the apparatus from the article.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

BRIEF DESCRIPTION

Embodiments will now be described by way of example only, with reference to the Figures, in which.

DETAILED DESCRIPTION

In the following description, the terms 'connected' and 'coupled' mean operationally connected and coupled. It should be appreciated that there may be any number of intervening components between the mentioned features, including no intervening components.

Figure 1:
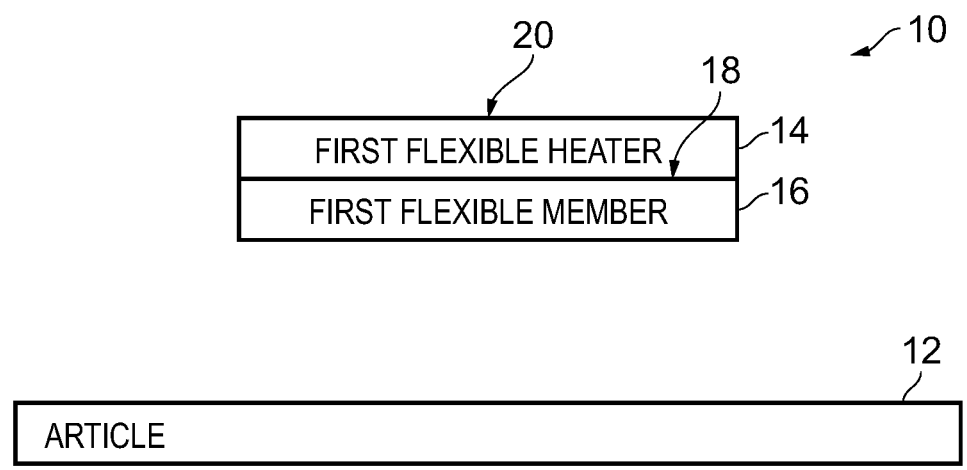
FIG. 1 illustrates a schematic side view of a first apparatus for providing thermal energy to an article according to various examples.

FIG. 1 illustrates a schematic side view of a first apparatus 10 for providing thermal energy to an article 12. The first apparatus 10 includes a first flexible heater 14 and a first flexible member 16. The article 12 may be any component, assembly of components, or object that is to be heat treated. For example, the article 12 may be an aerospace component such as a turbine blade or a composite material fan blade. In other examples, the article 12 may be a component used in the oil and gas industry, such as a steel pipe.

The first flexible heater 14 may be any suitable device that is configured to emit infrared radiation. For example, the first flexible heater 14 may include a flexible quartz tube filled with halogen gas, and one or more filaments positioned within the flexible quartz tube. In other examples, the first flexible heater 14 may comprise a flexible ceramic sheet, a flexible metal sheath, or an open coil arrangement. The first flexible heater 14 may be configured to emit short wave infrared radiation having a wavelength band in the range of 780 nm to 1400 nm. The first flexible heater 14 may have a Young's modulus in the range 0.05 to 0.1 GPa (approximately $10^9$ N/m$^2$).

The first flexible heater 14 defines a first surface 18 and a second surface 20 that is opposite to the first surface 18. The first flexible member 16 may be coupled to the first surface 18 of the first flexible heater 14 and comprises a flexible material that is configured to absorb the infrared radiation emitted by the first flexible heater 14 and to generate thermal energy from the absorbed infrared radiation. For example, the material of the first flexible member 16 may comprise a flexible ceramic of high thermal conductivity (for example, aluminium nitride 150 W/mk) or may alternatively comprise a stainless steel wire fabric. The first flexible member 16 may have a Young's modulus in the range 0.05 to 0.1 GPa. The first flexible member 16 may absorb 90% to 95% of incident infrared radiation from the first flexible heater 14.

The first flexible member 16 is configured to transfer the generated thermal energy to the article 12 through thermal conduction. In more detail, the first apparatus 10 may be placed in contact with the article 12 (for example, so that the first flexible member 16 abuts the article 12). The flexibility of the first flexible heater 14 and the first flexible member 16 enables the apparatus 10 to conform to the shape of the article 12. For example, where the article 12 is a turbine blade, the flexibility of the apparatus 10 may enable the apparatus 10 to snugly fit on at least a portion of the turbine blade such that there is little or no air gap between the apparatus 10 and the article 12. Electrical energy may then be supplied to the first flexible heater 14 to cause the first flexible heater 14 to emit infrared radiation. The first flexible member 16 absorbs the infrared radiation from the first flexible heater 14 and generates thermal energy that is then transferred to the article 12 via thermal conduction.

The first apparatus 10 may advantageously be used to provide heat treatment to the article 12 to reduce residual stress in the article 12. For example, the first apparatus 10 may be used pre-weld or post-weld to provide heat treatment to at least a portion of the article 12. The flexibility of the first apparatus 10 may enable the first apparatus 10 to fit snugly onto the article 12 (which may have a complex shape) and thus efficiently transfer thermal energy to the article 12 via thermal conduction. The transfer of thermal energy via thermal conduction may be advantageous where the article 12 is reflective to infrared radiation.

Figure 2:
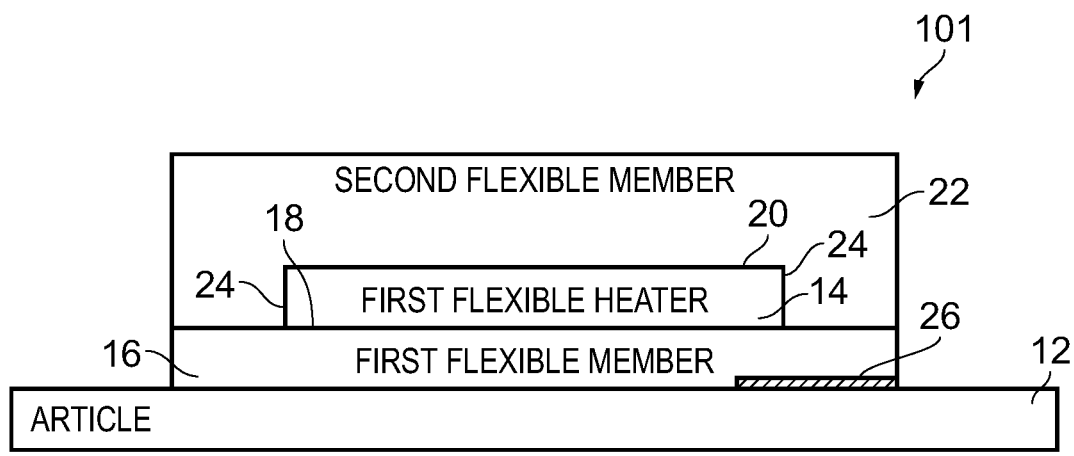
FIG. 2 illustrates a schematic side view of a second apparatus for providing thermal energy to an article according to various examples.

FIG. 2 illustrates a schematic side view of a second apparatus 101 for providing thermal energy to an article 12. The second apparatus 101 is similar to the first apparatus 10 illustrated in FIG. 1, and where the features are similar, the same reference numerals are used. The article 12 is similar to the article 12 illustrated in FIG. 1 and consequently the same reference numeral is used.

The second apparatus 101 differs from the first apparatus 10 in that the second apparatus 101 may additionally include a second flexible member 22 that may be coupled to the second surface 20 of the first flexible heater 14 and is arranged to thermally insulate the first flexible heater 14. The second flexible member 22 may comprise any suitable flexible thermal insulation material that has a relatively low thermal conductivity. For example, the second flexible member 22 may have a thermal conductivity in the range 0.025 W/mk to 0.04 W/mk at different temperatures, and may have a Young's modulus in the range 0.05 to 0.1 GPa. The second flexible member 22 may comprise silicon dioxide microporous insulation or insulation felts with ceramic fibres of low thermal conductivity. In some examples, the second flexible member 22 may extend around the edge 24 (or edges 24) of the first flexible heater 14 as illustrated in FIG. 2. In other examples, one or more further flexible members may extend around the edge 24 (or edges 24) of the first flexible heater 14. The one or more further flexible members may comprise silicone or any other suitable material.

The second apparatus 101 also differs from the first apparatus 10 in that the second apparatus 101 may additionally include thermally conductive paint 26 applied to a portion of the first flexible member 16. The thermally conductive paint 26 is arranged to increase the thermal energy generated at the portion and thus increase the transfer of thermal energy from the first flexible member 16 to the article 12 at the portion. The thermally conductive paint 26 may comprise a mixture of Toluene ($C_6H_5$—$CH_3$), silicone resins, silver compounds (Ag) and ethanol ($C_2H_6O$) with a thermal conductivity between 5 to 12 W/mK and may also act as an oxidation protective coating. It should be appreciated that thermally conductive paint 26 may be applied to a plurality of portions of the first flexible member 16 to increase the transfer of thermal energy to the article 12 from the plurality of portions.

The second apparatus 101 may be advantageous in that the second flexible member 22 may reduce thermal energy losses from the surfaces of the second apparatus 101 not in contact with the article 12. Furthermore, the thermally conductive paint 26 may advantageously provide the second apparatus 101 with a thermal energy transfer rate that varies across the second apparatus 101 (that is, the thermal energy transfer rate may be greater at the portion comprising thermally conductive paint than portions that do not comprise thermally conductive paint).

Figure 3:
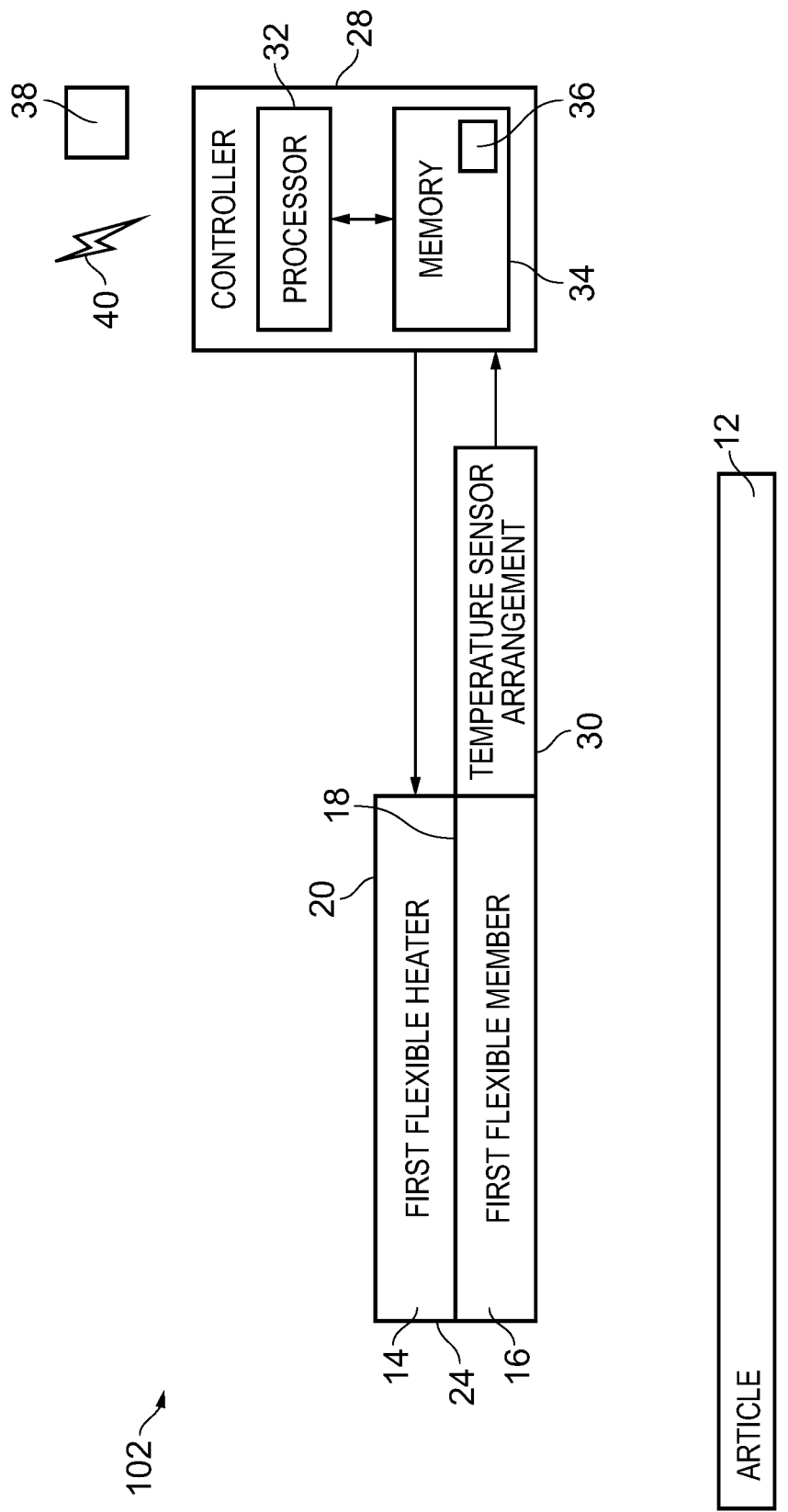
FIG. 3 illustrates a schematic side view of a third apparatus for providing thermal energy to an article according to various examples.

FIG. 3 illustrates a schematic side view of a third apparatus 102 for providing thermal energy to an article 12. The third apparatus 102 is similar to the first and second apparatus 10, 101 illustrated in FIGS. 1 and 2 and where the features are similar, the same reference numerals are used. The article 12 is similar to the articles 12 illustrated in FIGS. 1 and 2, and consequently, the same reference numeral is used. The third apparatus 102 may additionally include the second flexible member 22 and/or the thermally conductive paint 26 as illustrated in FIG. 2, and these features are not illustrated to maintain the clarity of FIG. 3.

The third apparatus 102 differs from the first apparatus 10 and the second apparatus 101 in that the third apparatus 102 additionally includes a controller 28. In some examples, the third apparatus 102 may also comprise a temperature sensor arrangement 30.

The controller 28 may comprise any suitable circuitry to control the operation of the first flexible heater 14. The controller 28 may be configured to control the supply of electrical energy to the first flexible heater 14 to control the amplitude of the infrared radiation emitted by the first flexible heater 14. For example, the controller 28 may control a supply of electrical energy to the first flexible heater 14 for a predetermined period of time so that the first flexible heater 14 only provides infrared radiation for that predetermined period of time.

In examples where the third apparatus 102 includes the temperature sensor arrangement 30, the controller 28 may be configured to receive data from the temperature sensor arrangement 30 and control the first flexible heater 14 using the received data. For example, where the controller 28 determines from the received data that the temperature is below a threshold temperature value, the controller 28 may control an increase in electrical energy supplied to the first flexible heater 14 to increase the amplitude of the infrared radiation emitted by the first flexible heater 14. By way of another example, where the controller 28 determines from the received data that the temperature is above a threshold temperature value, the controller 28 may control a decrease in electrical energy supplied to the first flexible heater 14 to decrease the amplitude of the infrared radiation emitted by the first flexible heater 14.

The controller 28 may comprise: control circuitry; and/or processor circuitry; and/or at least one application specific integrated circuit (ASIC); and/or at least one field programmable gate array (FPGA); and/or single or multi-processor architectures; and/or sequential/parallel architectures; and/or at least one programmable logic controllers (PLCs); and/or at least one microprocessor; and/or at least one microcontroller; and/or a central processing unit (CPU); and/or a graphics processing unit (GPU).

In various examples, the controller 28 may comprise at least one processor 32 and at least one memory 34. The memory 34 stores a computer program 36 comprising computer readable instructions that, when read by the processor 32, causes the controller 28 to control the operation of the first flexible heater 14. The computer program 36 may be software or firmware, or may be a combination of software and firmware.

The processor 32 may be integral with, or located on, the structure of the first flexible heater 14, the first flexible member 16, and the second flexible member 22, or may be located remote from the structure 14, 16, 22, or may be distributed between the structure 14, 16, 22 and a location remote from the structure 14, 16, 22. The processor 32 may include at least one microprocessor and may comprise a single core processor, may comprise multiple processor cores (such as a dual core processor or a quad core processor), or may comprise a plurality of processors (at least one of which may comprise multiple processor cores).

The memory 34 may be integral with, or located on, the structure of the first flexible heater 14, the first flexible member 16, and the second flexible member 22, or may be located remote from the structure 14, 16, 22, or may be distributed between the structure 14, 16, 22 and a location remote from the structure 14, 16, 22. The memory 34 may be any suitable non-transitory computer readable storage medium, data storage device or devices, and may comprise a hard disk and/or solid state memory (such as flash memory). The memory 34 may be permanent non-removable memory, or may be removable memory (such as a universal serial bus (USB) flash drive or a secure digital card). The memory 34 may include: local memory employed during actual execution of the computer program 36; bulk storage; and cache memories which provide temporary storage of at least some computer readable or computer usable program code to reduce the number of times code may be retrieved from bulk storage during execution of the code.

The computer program 36 may be stored on a non-transitory computer readable storage medium 38. The computer program 36 may be transferred from the non-transitory computer readable storage medium 38 to the memory 34. The non-transitory computer readable storage medium 38 may be, for example, a USB flash drive, a secure digital (SD) card, an optical disc (such as a compact disc (CD), a digital versatile disc (DVD) or a Blu-ray disc). In some examples, the computer program 36 may be transferred to the memory 34 via a signal 40 (such as a wireless signal or a wired signal).

Input/output devices may be coupled to the controller 28 either directly or through intervening input/output controllers. Various communication adaptors may also be coupled to the controller 28 to enable the apparatus 102 to become coupled to other apparatus or remote printers or storage devices through intervening private or public networks. Non-limiting examples include modems and network adaptors of such communication adaptors.

The temperature sensor arrangement 30 may include any suitable device or devices for sensing one or more temperatures of the article 12. For example, the temperature sensor arrangement 30 may comprise one or more thermocouples that are configured to sense one or more temperatures of the article 12. In other examples, the temperature sensor arrangement 30 may include one or more resistance temperature detectors. The temperature sensor arrangement 30 may be integral with (that is, part of) the structure 14, 16 (for example, one or more thermocouples may be embedded within the first flexible member 16), or may be separate to the structure 14, 16. The controller 28 is configured to receive data from the temperature sensor arrangement 30.

Figure 4:
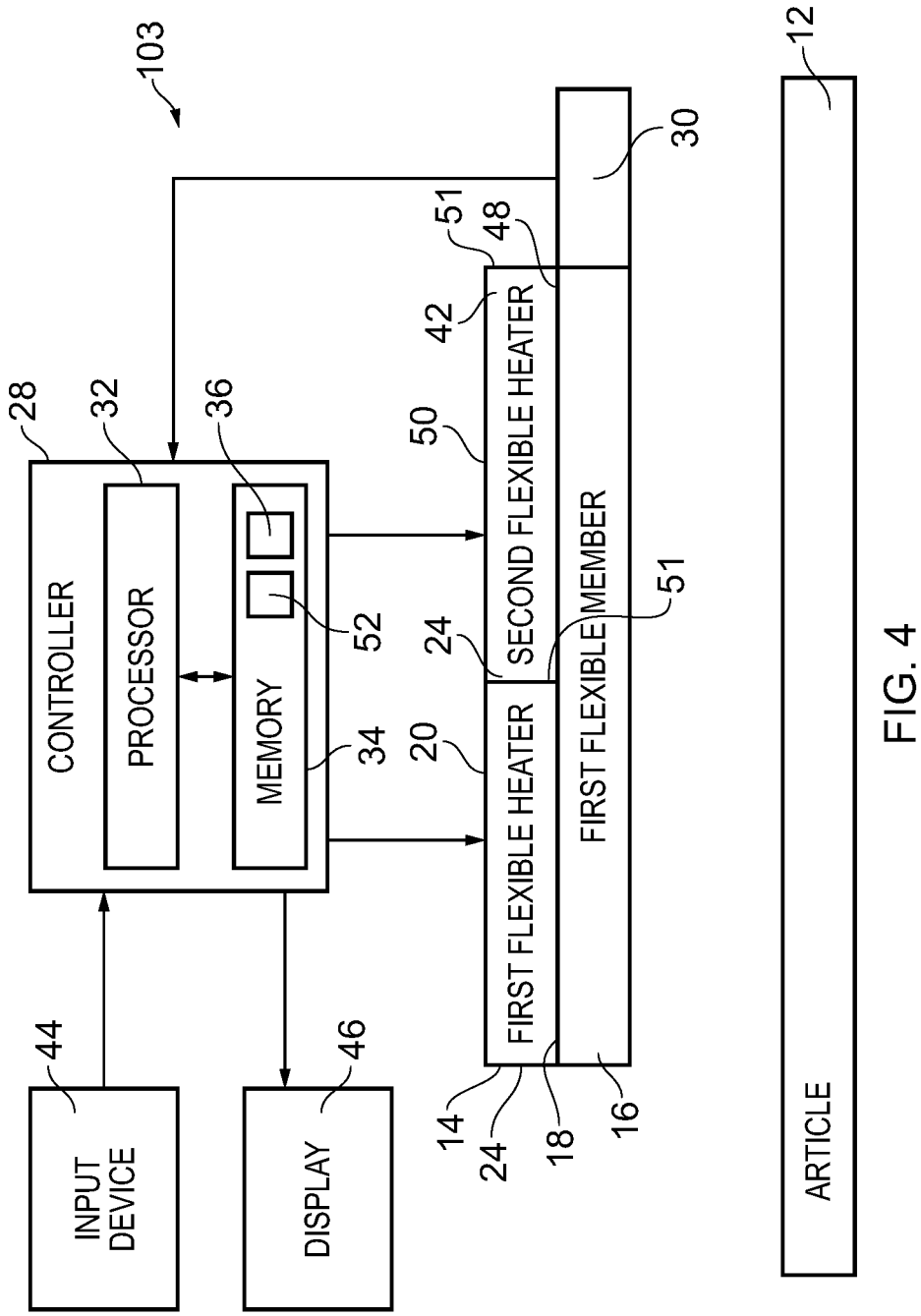
FIG. 4 illustrates a schematic side view of a fourth apparatus for providing thermal energy to an article according to various examples.

FIG. 4 illustrates a schematic side view of a fourth apparatus 103 for providing thermal energy to an article 12. The fourth apparatus 103 is similar to the first, second and third apparatus 10, 101, 102 illustrated in FIGS. 1, 2 and 3, and where the features are similar, the same reference numerals are used. The article 12 is similar to the articles 12 illustrated in FIGS. 1, 2, and 3, and consequently, the same reference numeral is used. The fourth apparatus 103 differs from the first, second, and third apparatus 10, 101, 102 in that the fourth apparatus 103 further comprises a second flexible heater 42, an input device 44, and a display 46.

The second flexible heater 42 may be any suitable device that is configured to emit infrared radiation and may be the same device as, or a different device to, the first flexible heater 14. For example, the second flexible heater 42 may include a flexible quartz tube filled with halogen gas, and one or more filaments positioned within the flexible quartz tube. The second flexible heater 42 may be configured to emit short wave infrared radiation having a wavelength band in the range of 780 nm to 1400 nm.

The second flexible heater 42 defines a first surface 48, a second surface 50 that is opposite to the first surface 48, and an edge 51 that extends between the first surface 48 and the second surface 50. The first flexible member 16 is coupled to the first surface 48 of the second flexible heater 42 and comprises a material that is configured to absorb the infrared radiation emitted by the second flexible heater 42 and to generate thermal energy from the absorbed infrared radiation. The second flexible heater 42 may be positioned adjacent the first flexible heater 14 in a co-planar arrangement and so that the first and second surfaces 48, 50 of the second flexible heater 42 are parallel to (and co-planar with) the first and second surfaces 18, 20 of the first flexible heater 14.

The input device 44 may comprise any suitable device for enabling an operator to at least partially control the apparatus 103. For example, the input device 44 may comprise one or more of a keyboard, a keypad, a touchpad, a touchscreen display, and a computer mouse. The controller 28 is configured to receive signals from the input device 44.

The display 46 may be any suitable device for conveying information to an operator of the apparatus 103. For example, the display 46 may be a liquid crystal display, a light emitting diode display, an active matrix organic light emitting diode display, a thin film transistor display, or a cathode ray tube display. The controller 28 is configured to control the display 46 to cause the display 46 to convey information to the user.

The controller 28 is configured to control the first flexible heater 14 and the second flexible heater 42 to emit infrared radiation. For example, the controller 28 may be configured to control the first flexible heater 14 to emit infrared radiation having a first amplitude, and to control the second flexible heater 42 to emit infrared radiation having a second amplitude, different to the first amplitude, according to a predetermined heating profile 52 stored in the memory 34. By way of another example, the controller 28 may be configured to control the first flexible heater 14 to emit infrared radiation in a first wavelength band, and to control the second flexible heater 42 to emit infrared radiation in a second wavelength band, different to the first wavelength band, according to a predetermined heating profile 52 stored in the memory 34. By way of a further example, the controller 28 may be configured to control the first flexible heater 14 and the second flexible heater 42 to emit infrared radiation in different wavelength bands and having different amplitudes. In other examples, the controller 28 may be configured to provide common control to the first flexible heater 14 and to the second flexible heater 42 (for example, so that they both emit infrared radiation having the same amplitude and in the same wavelength band).

An operator may use the user input device 44 and the display 46 to input one or more heating profiles 52 to the fourth apparatus 103. For example, an operator may operate the input device 44 to input a heating profile where the first flexible heater 14 is to emit infrared radiation having a higher amplitude than the infrared radiation to be emitted by the second flexible heater 42. The controller 28 may control the display 46 to display a graphical user interface (GUI) to facilitate the operators' input of the heating profile. The controller 28 is configured to store the one or more heating profiles input by the operator in the memory 34.

It should be appreciated that the fourth apparatus 103 may additionally include the second flexible member 22 and/or the thermally conductive paint 26 as illustrated in FIG. 2, and these features are not illustrated to maintain the clarity of FIG. 4. The second flexible member 22 may be coupled to the second surface 50 of the second flexible heater 52. In some examples, the second flexible member 22 may additionally extend alongside (and may be coupled to) the edge 51 of the second flexible heater 48. In other examples, one or more further flexible members may extend alongside (and may be coupled to) the edge 51 of the second flexible heater 48.

The fourth apparatus 103 may be advantageous in that the fourth apparatus 103 may provide varying heat treatment across the part of the article 12 to which the fourth apparatus 103 is applied. For example, where the first flexible heater 14 emits infrared radiation having a greater amplitude than the infrared radiation emitted by the second flexible heater 42, the apparatus 103 may conduct a large amount of heat energy from the portion of the first flexible member 16 adjacent to the first flexible heater 14, and less heat energy from the portion of the first flexible member 16 that is adjacent to the second flexible heater 42.

It should be appreciated that an apparatus according to the present patent application may comprise any number of flexible heaters. For example, an apparatus may comprise three, four, five, or more flexible heaters.

Figure 5:
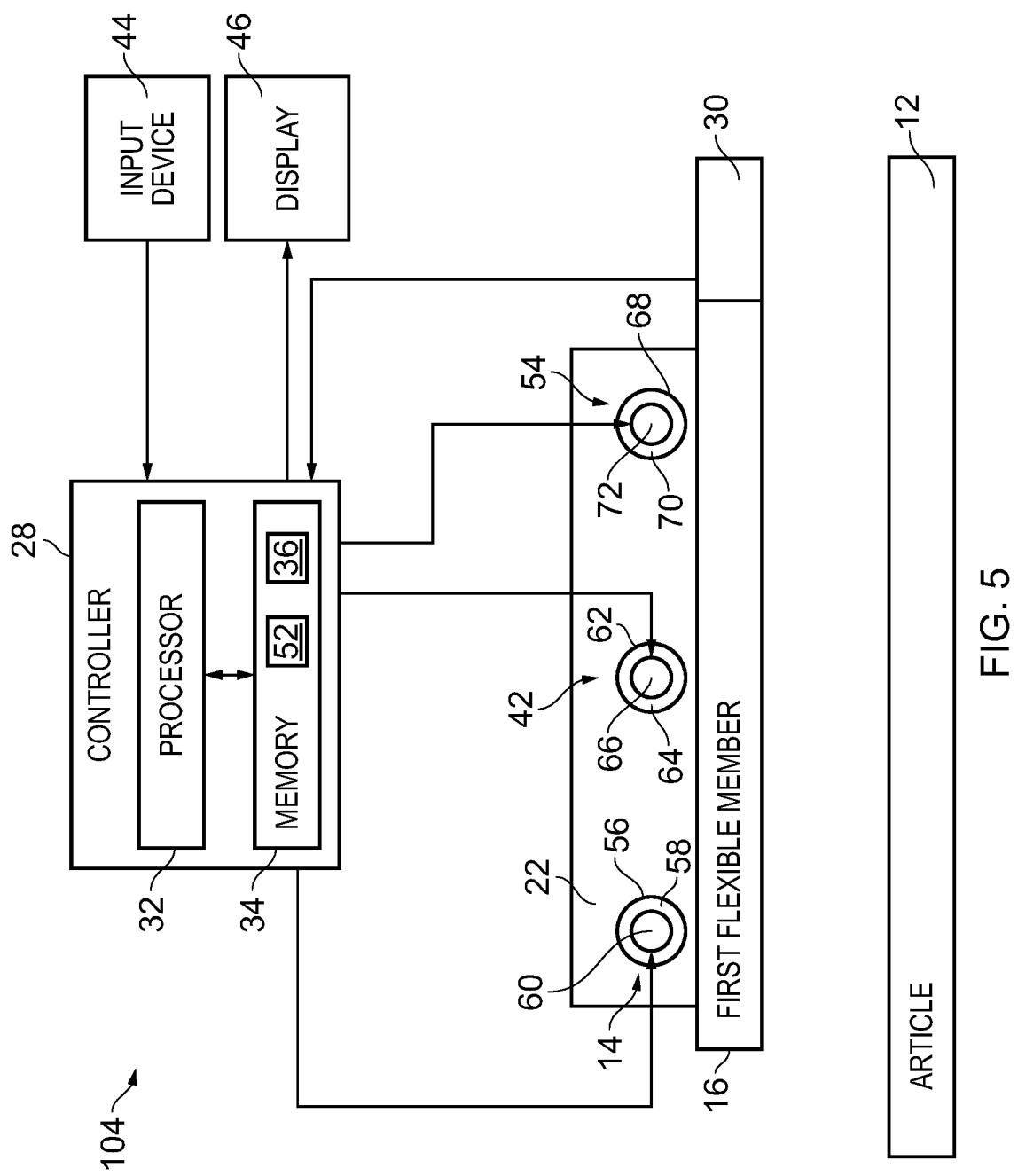
FIG. 5 illustrates a schematic side view of a fifth apparatus for providing thermal energy to an article according to various examples.

FIG. 5 illustrates a schematic side view of a fifth apparatus 104 for providing thermal energy to an article 12. The fifth apparatus 104 is similar to the first, second, third, and fourth apparatus 10, 101, 102, 103 illustrated in FIGS. 1, 2, 3 and 4, and where the features are similar, the same reference numerals are used. The article 12 is similar to the articles 12 illustrated in FIGS. 1, 2, 3, and 4 and consequently, the same reference numeral is used.

The fifth apparatus 104 includes a first flexible heater 14, and a second flexible heater 42 and third flexible heater 54. The first flexible heater 14 includes a first flexible tube 56 defining a first cavity 58, and a first flexible elongate heater 60 positioned within the first cavity 58 of the first flexible tube 56. The first flexible tube 56 has a circular cross sectional shape, but may have another cross sectional shape in other examples. The first flexible tube 56 may comprise any suitable material and comprises flexible quartz in this example. The Young's modulus of the flexible quartz tube 56 may be (for example) between 0.05 to 0.1 GPa. The first flexible elongate heater 60 may comprise any suitable heater element that is configured to receive electrical energy and to emit infrared radiation from the received electrical energy. For example, the first flexible elongate heater 60 may comprise a tungsten filament.

The controller 28 is configured to control the operation of the first flexible heater 14. For example, the controller 28 may be configured to control the supply of electrical energy to the first flexible heater 14 and thus the amplitude of the infrared radiation emitted from the first flexible heater 14. By way of another example, the controller 28 may be configured to control matching circuitry coupled to the first flexible heater 14 to control the wavelength band of the infrared radiation emitted from the first flexible heater 14. The controller 28 may be configured to control the operation of the first flexible heater 14 separately to the second flexible heater 42 and the third flexible heater 54. Alternatively, the controller 28 may provide common control of the first flexible heater 14, the second flexible heater 42 and the third flexible heater 54.

The second flexible heater 42 includes a second flexible tube 62 defining a second cavity 64, and a second flexible elongate heater 66 positioned within the second cavity 64 of the second flexible tube 62. The second flexible tube 62 has a circular cross sectional shape, but may have another cross sectional shape in other examples. The second flexible tube 62 may comprise any suitable material and comprises quartz in this example. The second flexible elongate heater 66 may comprise any suitable heater element that is configured to receive electrical energy and to emit infrared radiation from the received electrical energy. For example, the second flexible elongate heater 66 may comprise a tungsten filament.

The controller 28 is configured to control the operation of the second flexible heater 42. For example, the controller 28 may be configured to control the supply of electrical energy to the second flexible heater 42 and thus control the amplitude of the infrared radiation emitted from the second flexible heater 42. By way of another example, the controller 28 may be configured to control matching circuitry coupled to the second flexible heater 42 to control the wavelength band of the infrared radiation emitted from the second flexible heater 42. The controller 28 may be configured to control the operation of the second flexible heater 42 separately to the first flexible heater 14 and the third flexible heater 54. Alternatively (and as mentioned above), the controller 28 may provide common control of the first flexible heater 14, the second flexible heater 42 and the third flexible heater 54.

The third flexible heater 54 includes a third flexible tube 68 defining a third cavity 70, and a third flexible elongate heater 72 positioned within the third cavity 70 of the third flexible tube 68. The third flexible tube 68 has a circular cross sectional shape, but may have another cross sectional shape in other examples. The third flexible tube 68 may comprise any suitable material and comprises quartz in this example. The third flexible elongate heater 72 may comprise any suitable heater element that is configured to receive electrical energy and to emit infrared radiation from the received electrical energy. For example, the third flexible elongate heater 72 may comprise a tungsten filament.

The controller 28 is configured to control the operation of the third flexible heater 54. For example, the controller 28 may be configured to control the supply of electrical energy to the third flexible heater 54 and thus control the amplitude of the infrared radiation emitted from the third flexible heater 54. By way of another example, the controller 28 may be configured to control matching circuitry coupled to the third flexible heater 54 to control the wavelength band of the infrared radiation emitted from the third flexible heater 54. The controller 28 may be configured to control the operation of the third flexible heater 54 separately to the first flexible heater 14 and the second flexible heater 42. Alternatively (and as mentioned above), the controller 28 may provide common control of the first flexible heater 14, the second flexible heater 42 and the third flexible heater 54.

Figure 6:
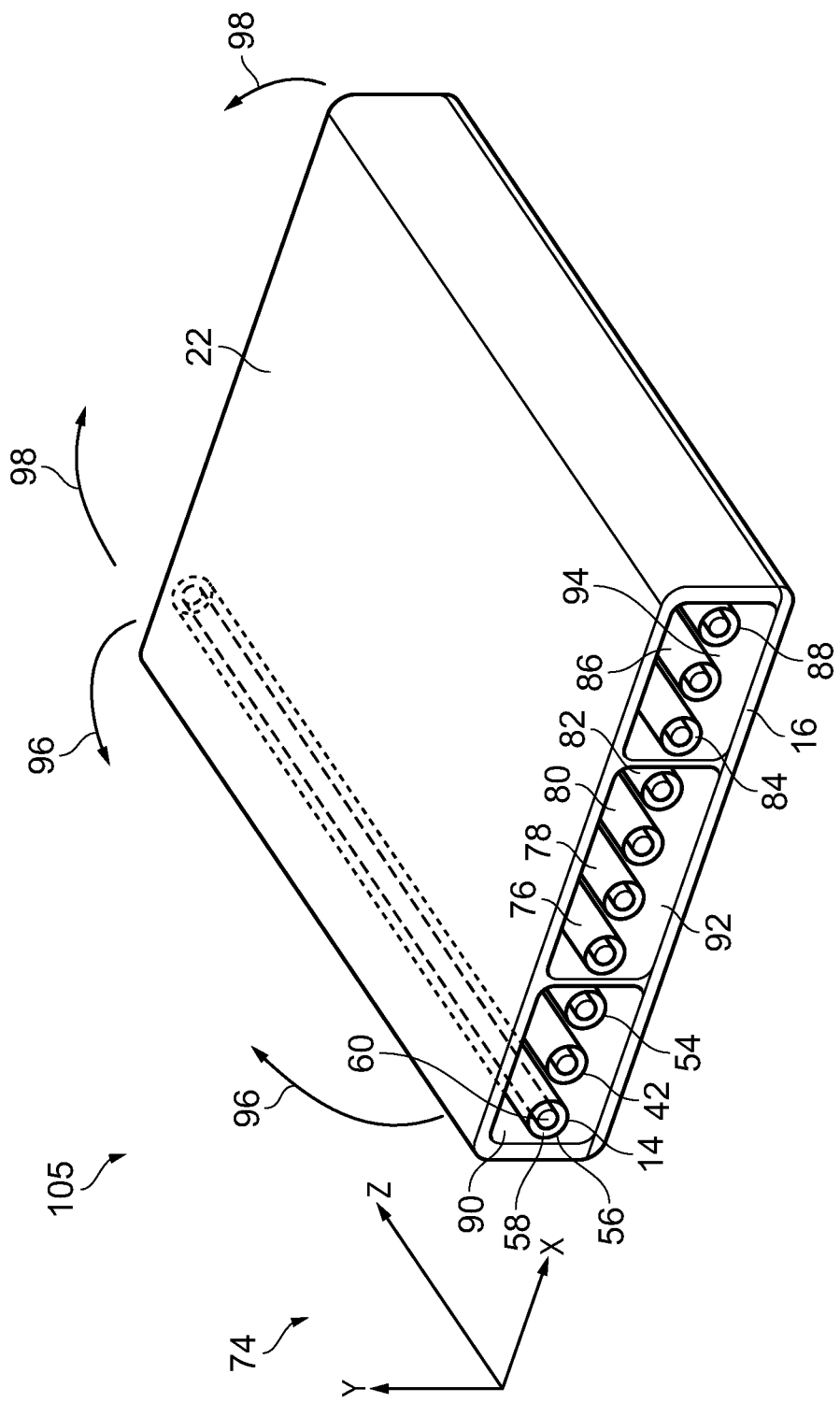
FIG. 6 illustrates a perspective view of a sixth apparatus for providing thermal energy to an article according to various examples.

FIG. 6 illustrates a perspective view of a sixth apparatus 105 and a Cartesian coordinate system 74. The sixth apparatus 105 is similar to the fourth apparatus 103 illustrated in FIG. 5, and where the features are similar, the same reference numerals are used. The Cartesian coordinate system 74 includes an X axis, a Y axis and a Z axis that are orthogonal to one another to one another.

The sixth apparatus 105 has a cuboid shape and has a length that extends parallel to the Z axis, a width that extends parallel to the X axis, and a depth that extends parallel to the Y axis. The sixth apparatus 105 includes the first flexible heater 14, the second flexible heater 42, the third flexible heater 54, a fourth flexible heater 76, a fifth flexible heater 78, a sixth flexible heater 80, a seventh flexible heater 82, an eighth flexible heater 84, a ninth flexible heater 86, and a tenth flexible heater 88. The first to tenth flexible heaters 14, 42, 54, 76, 78, 80, 82, 84, 86, 88 may have the same structure as the flexible heaters 14, 42, 54 illustrated in FIG. 5.

The first flexible member 16 and the second flexible member 22 define a first cavity 90, a second cavity 92 and a third cavity 94 there between. The first cavity 90, the second cavity 92, and the third cavity 94 are positioned adjacent one another along the width of the sixth apparatus 105 and extend along the length of the sixth apparatus 105 in a direction parallel to the Z axis. The first, second and third flexible heaters 14, 42, 54 are positioned within the first cavity 90 and extend along the length of the sixth apparatus 105 in a direction parallel to the Z axis. The fourth, fifth, sixth and seventh flexible heaters 76, 78, 80, 82 are positioned within the second cavity 92 and extend along the length of the sixth apparatus 105 in a direction parallel to the Z axis. The eighth, ninth and tenth flexible members 84, 86, 94 are positioned within the third cavity 94 and extend along the length of the sixth apparatus 105.

The first flexible tube 56, the first cavity 58 and the first flexible elongate heater 60 of the first flexible heater 14 are illustrated in FIG. 6 with dotted lines to represent the first flexible tube 56 and the first flexible elongate heater 60 where they are not visible from the exterior of the sixth apparatus 105. It should be appreciated that the second to tenth flexible heaters 42, 54, 76, 78, 80, 82, 84, 86, 88 may have the same structure as the first flexible heater 14, but are not similarly illustrated to maintain the clarity of FIG. 6.

The first to tenth flexible heaters 14, 42, 54, 76, 78, 80, 82, 84, 86, 88 may be coupled to the first flexible member 16 and/or to the second flexible member 22. For example, the flexible tubes of the first to tenth flexible heaters 14, 42, 54, 76, 78, 80, 82, 84, 86, 88 may be coupled to the first flexible member 16 and/or to the second flexible member 22 via an adhesive. In other examples, the first to tenth flexible heaters 14, 42, 54, 76, 78, 80, 82, 84, 86, 88 may be surrounded by porous ceramic particles that fix them in position, but still enable the sixth apparatus 105 to bend.

The sixth apparatus 105 is flexible and may, for example, be deformed as indicated by arrows 96 and arrows 98. This may advantageously enable the sixth apparatus 105 to adopt a non-planar shape and be positioned on an object having a complex shape.

Figure 7:
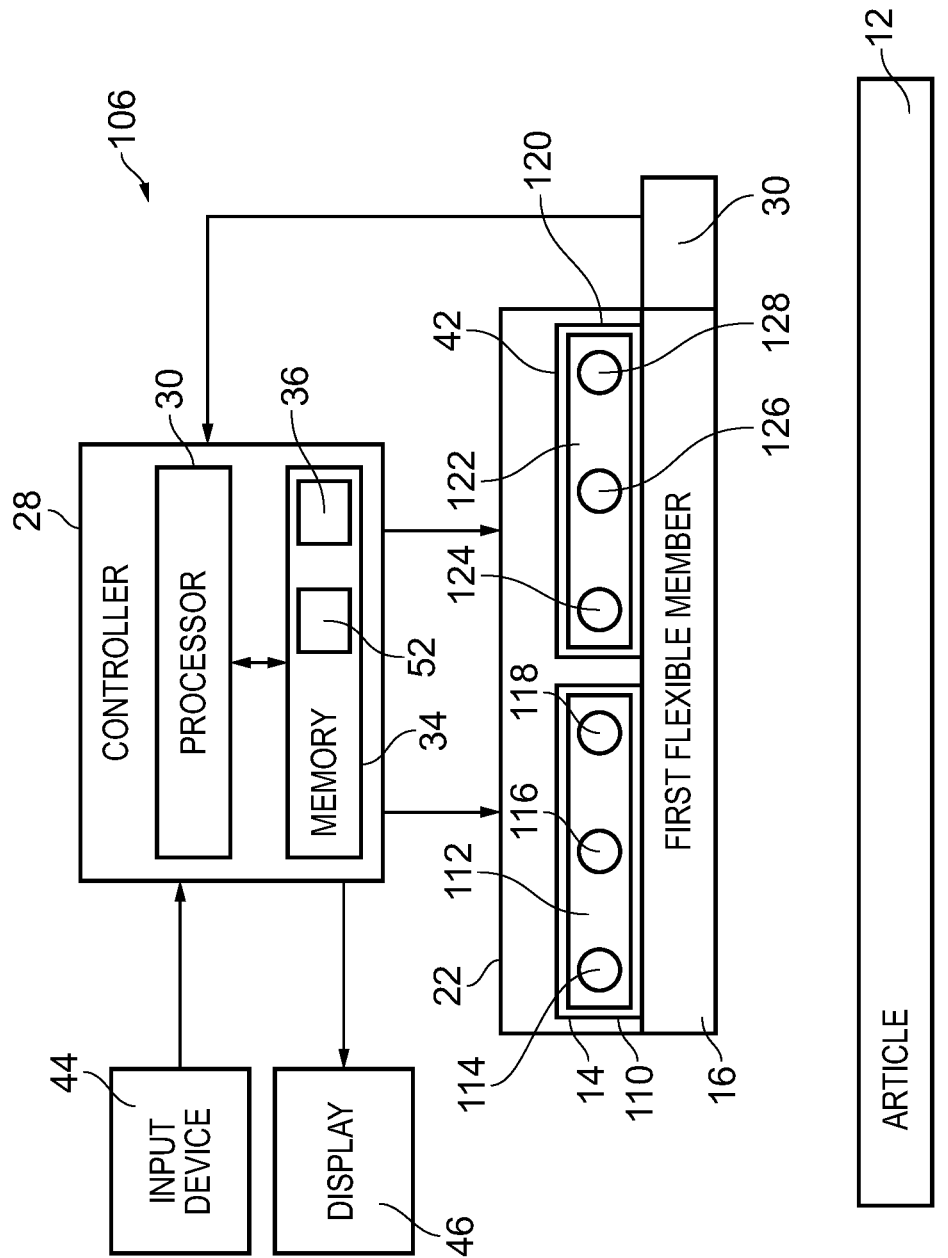
FIG. 7 illustrates a schematic side view of a seventh apparatus for providing thermal energy to an article according to various examples.

FIG. 7 illustrates a schematic side view of a seventh apparatus 106 for providing thermal energy to an article 12. The fifth apparatus 104 is similar to the first, second, third, fourth apparatus, fifth apparatus and sixth apparatus 10, 101, 102, 103, 104, 105, illustrated in FIGS. 1, 2, 3, 4, 5 and 6, and where the features are similar, the same reference numerals are used. The article 12 is similar to the articles 12 illustrated in FIGS. 1, 2, 3, 4 and 5 and consequently, the same reference numeral is used.

The first flexible heater 14 of the seventh apparatus 106 includes a first flexible tube 110 that defines a first cavity 112, a first flexible elongate heater 114, a second flexible elongate heater 116, and a third flexible elongate heater 118. The first flexible tube 110 comprises flexible quartz and has a rectangular cross sectional shape, but may have a different cross sectional shape in other examples. The first, second and third flexible elongate heaters 114, 116, 118 are positioned within the first cavity 112 of the first flexible tube 110. The controller 28 is configured to control the operation of the first flexible heater 14. In some examples, the controller 28 may be configured to individually control each of the first, second and third flexible elongate heaters 114, 116, 118. In other examples, the controller 28 may alternatively (or additionally) be configured to commonly control the first, second and third flexible elongate heaters 114, 116, 118.

The second flexible heater 42 of the seventh apparatus 106 includes a second flexible tube 120 that defines a second cavity 122, a fourth flexible elongate heater 124, a fifth flexible elongate heater 126, and a sixth flexible elongate heater 128. The second flexible tube 120 comprises flexible quartz and has a rectangular cross sectional shape, but may have a different cross sectional shape in other examples. The fourth, fifth and sixth flexible elongate heaters 124, 126, 128 are positioned within the second cavity 122 of the second flexible tube 120. The controller 28 is configured to control the operation of the second flexible heater 14. In some examples, the controller 28 may be configured to individually control each of the fourth, fifth and sixth flexible elongate heaters 124, 126, 128. In other examples, the controller 28 may alternatively (or additionally) be configured to commonly control the fourth, fifth and sixth flexible elongate heaters 124, 126, 128.

Figure 8:
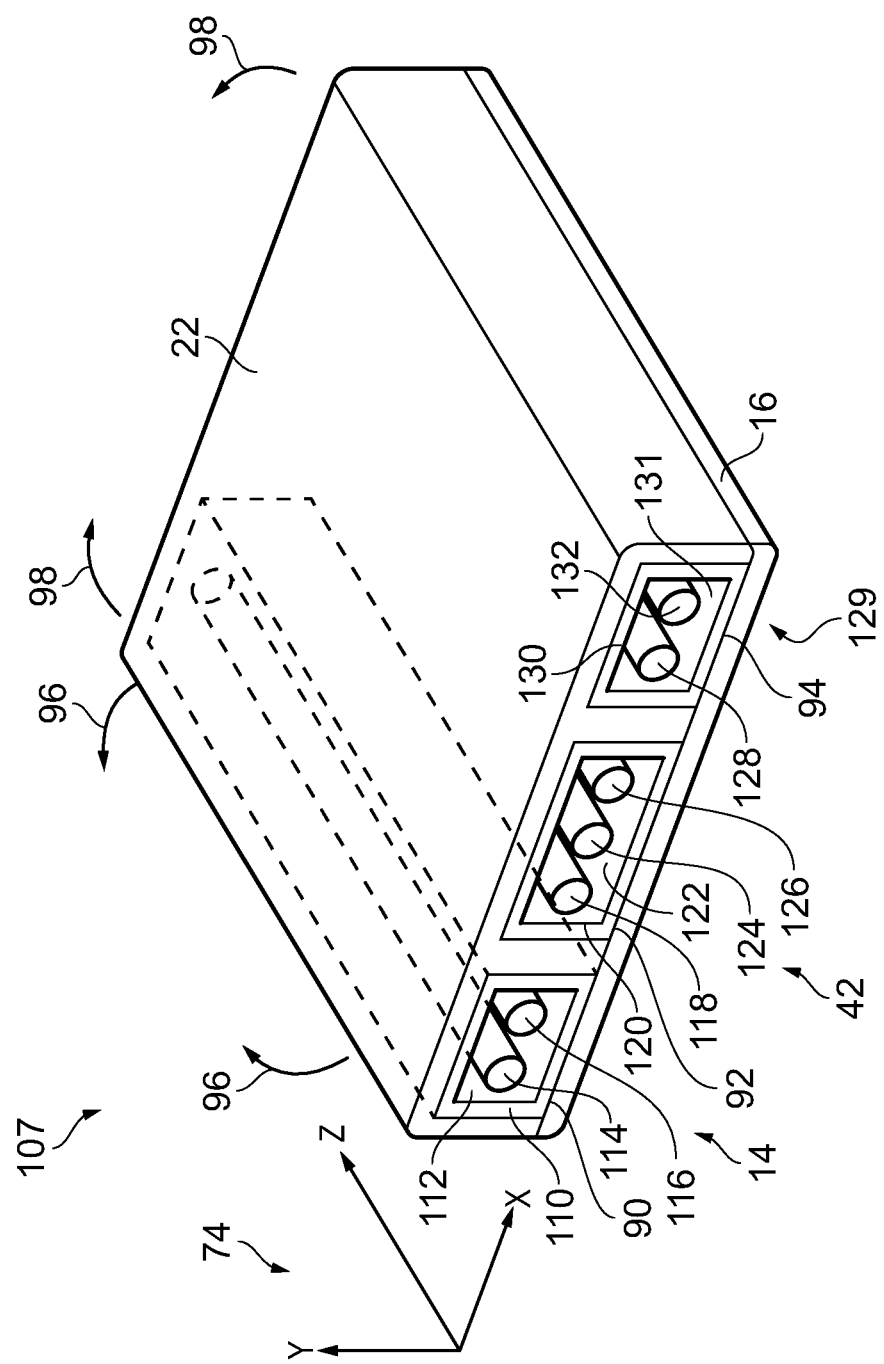
FIG. 8 illustrates a perspective view of an eighth apparatus for providing thermal energy to an article according to various examples.

FIG. 8 illustrates a perspective view of an eighth apparatus 107 and a Cartesian coordinate system 74. The eighth apparatus 107 is similar to the sixth apparatus 105 illustrated in FIG. 6, and to the seventh apparatus 106 illustrated in FIG. 7, and where the features are similar, the same reference numerals are used. The Cartesian coordinate system 74 includes an X axis, a Y axis and a Z axis that are orthogonal to one another.

The eighth apparatus 107 has a cuboid shape and has a length that extends parallel to the Z axis, a width that extends parallel to the X axis, and a depth that extends parallel to the Y axis. The eighth apparatus 107 includes a first flexible heater 14, a second flexible heater 42, and a third flexible heater 129. The first, second and third flexible heaters 14, 42, 129 may have the same structure as the flexible heaters 14 and 42 illustrated in FIG. 7.

The first flexible member 16 and the second flexible member 22 define a first cavity 90, a second cavity 92 and a third cavity 94 there between. The first cavity 90, the second cavity 92, and the third cavity 94 are positioned adjacent one another along the width of the eighth apparatus 107 and extend along the length of the eighth apparatus 107 in a direction parallel to the Z axis. The first flexible heater 14 is positioned within the first cavity 90 and extends along the length of the eighth apparatus 107 in a direction parallel to the Z axis. The second flexible heater 42 is positioned within the second cavity 92 and extends along the length of the eighth apparatus 107 in a direction parallel to the Z axis.

The third flexible heater 129 is positioned within the third cavity 94 and extends along the length of the eighth apparatus 107.

The first, second and third flexible tubes 110, 120, 130 have rectangular cross sectional shapes and define first, second and third cavities 112, 122, 131 respectively. The first and second flexible elongate heaters 114, 116 are positioned within the first cavity 112 of the first flexible tube 110 and extend along the length of the eighth apparatus 107 and parallel to the Z axis. The third, fourth, and fifth flexible elongate heaters 118, 124, 126 are positioned within the second cavity 122 of the second flexible tube 120 and extend along the length of the eighth apparatus 107 and parallel to the Z axis. The sixth flexible elongate heater 128 and a seventh flexible elongate heater 132 are positioned within the third cavity 131 of the third flexible tube 130 and extend along the length of the eighth apparatus 107 and parallel to the Z axis.

The first flexible tube 110, the first cavity 112 and the first flexible elongate heater 114 of the first flexible heater 14 are illustrated in FIG. 8 such that dotted lines represent the first flexible tube 110 and the first flexible elongate heater 114 where they are not visible from the exterior of the eighth apparatus 107. It should be appreciated that the second flexible elongate heater 116, and the second and third flexible heaters 42, 129 may have the same internal structure, but are not similarly illustrated to maintain the clarity of FIG. 8.

The first, second and third flexible heaters 14, 42, 129 may be coupled to the first flexible member 16 and/or to the second flexible member 22. For example, the flexible tubes of the first, second and third flexible heaters 14, 42, 129 may be coupled to the first flexible member 16 and/or to the second flexible member 22 via an adhesive. In other examples, the first, second and third flexible heaters 14, 42, 129 may be surrounded by porous ceramic particles that fix them in position, but still enable the eighth apparatus 107 to bend.

The eighth apparatus 107 is flexible and may, for example, be deformed as indicated by arrows 96 and arrows 98. This may advantageously enable the eighth apparatus 107 to adopt a non-planar shape and be positioned on an object having a complex shape.

Figure 9:
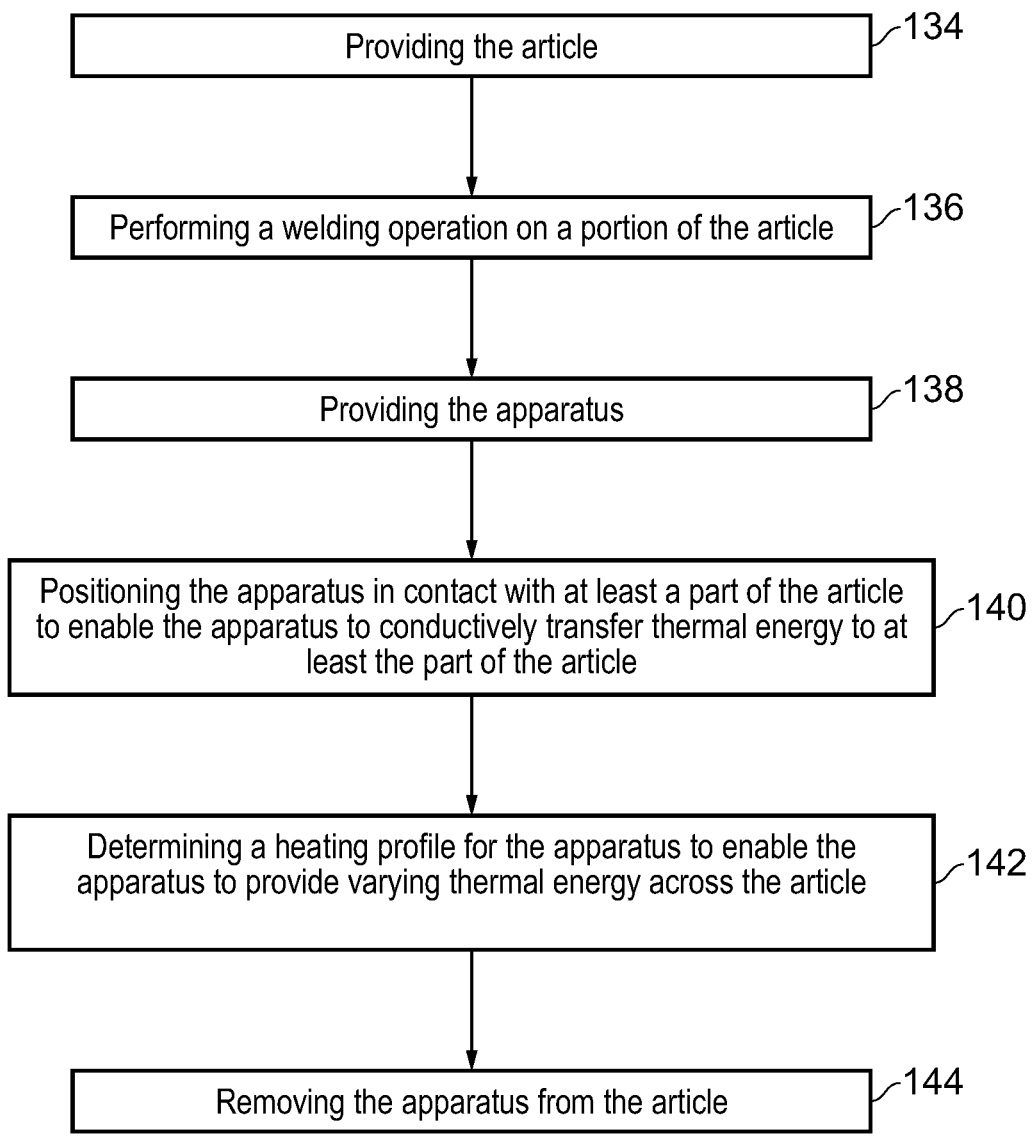
FIG. 9 illustrates a flow diagram of a method of providing thermal energy to an article according to various examples.

FIG. 9 illustrates a flow diagram of a method of providing thermal energy to an article according to various examples.

At block 134, the method includes providing the article 12.

At block 136, the method may include performing a welding operation on a portion of the article 12. For example, an operator may weld a first component of the article 12 to a second component of the article 12.

At block 138, the method includes providing an apparatus according to the present patent application. For example, block 138 may include providing the first apparatus 10, the second apparatus 101, the third apparatus 102, the fourth apparatus 103, the fifth apparatus 104, the sixth apparatus 105, the seventh apparatus 106 or the eighth apparatus 107.

At block 140, the method includes positioning the apparatus 10, 101, 102, 103, 104, 105, 106, 107 in contact with at least a part of the article 12 to enable the apparatus 10, 101, 102, 103, 104, 105, 106, 107 to conductively transfer thermal energy to at least the part of the article 12. For example, the apparatus 10, 101, 102, 103, 104, 105, 106, 107 may be positioned in contact with a weld seam of the article 12.

At block 142, the method may include determining a heating profile for the apparatus 103, 104, 105, 106, 107 to enable the apparatus 103, 104, 105, 106, 107 to provide varying thermal energy across the part of the article 12. For example, an operator may use the input device 44 and the display 46 to select or generate a heating profile. In this example, block 142 may be performed prior to block 136 so that a suitable heating profile has been selected prior to welding. By way of another example, the controller 28 may use sensed temperature data received from the temperature sensor arrangement 30 to determine a heating profile (for example, so that the apparatus provides thermal energy to locations on the article 12 that have a temperature below a predetermined threshold temperature).

At block 140 and/or block 142, the method includes controlling the supply of electrical energy to the one or more flexible heaters of the apparatus 10, 101, 102, 103, 104, 105, 106, 107 so that thermal energy is provided to the article 12.

At block 144, the method may include removing the apparatus 10, 101, 102, 103, 104, 105, 106, 107 from the article 12.

It should be appreciated that where the apparatus 10, 101, 102, 103, 104, 105, 106, 107 is applied to the article 12 prior to the welding operation, block 136 is performed after block 144. In these examples, the apparatus 10, 101, 102, 103, 104, 105, 106, 107 may be positioned on the part of the article that is to be welded.

It will be understood that the invention is not limited to the embodiments above-described and various modifications and improvements can be made without departing from the concepts described herein. For example, the different embodiments may take the form of an entirely hardware embodiment, an entirely software embodiment, or an embodiment containing both hardware and software elements.

Except where mutually exclusive, any of the features may be employed separately or in combination with any other features and the disclosure extends to and includes all combinations and sub-combinations of one or more features described herein.

We claim:

1. Apparatus for providing thermal energy to an article, the apparatus comprising:
    a first flexible heater configured to emit infrared radiation, wherein the first flexible heater includes a first flexible tube defining a cavity, and a first flexible elongate heater positioned within the cavity of the first flexible tube; and
    a first flexible member comprising a material, the first flexible member being configured to deform to substantially conform to the article, the material being configured to absorb the infrared radiation emitted by the first flexible heater and to generate thermal energy from the absorbed infrared radiation, and the first flexible member being configured to transfer the generated thermal energy to the article through thermal conduction.

2. Apparatus as claimed in claim 1, wherein the first flexible heater defines a first surface and a second surface, the first surface being opposite to the second surface, the first flexible member being coupled to the first surface of the first flexible heater.

3. Apparatus as claimed in claim 1, wherein the first flexible heater includes a second flexible elongate heater positioned within the cavity of the first flexible tube.

4. Apparatus as claimed in claim 3, further comprising a controller configured to control the first flexible elongate heater to emit infrared radiation and to control the second flexible elongate heater to emit infrared radiation.

5. Apparatus as claimed in claim 4, wherein the controller is configured to control the first flexible elongate heater to emit infrared radiation having a first amplitude, and to control the second flexible elongate heater to emit infrared radiation having a second amplitude, different to the first amplitude, to provide a predetermined heating profile.

6. Apparatus as claimed in claim 1, further comprising a second flexible heater configured to emit infrared radiation.

7. Apparatus as claimed in claim 6, wherein the second flexible heater defining a first surface and a second surface, the first surface being opposite to the second surface, the first flexible member being coupled to the first surface of the second flexible heater.

8. Apparatus as claimed in claim 6, further comprising a controller configured to control the first flexible heater and the second flexible heater to emit infrared radiation.

9. Apparatus as claimed in claim 8, wherein the controller is configured to control the first flexible heater to emit infrared radiation having a first amplitude, and to control the second flexible heater to emit infrared radiation having a second amplitude, different to the first amplitude, to provide a predetermined heating profile.

10. Apparatus as claimed in claim 1, further comprising a temperature sensor arrangement configured to sense one or more temperatures of the article.

11. Apparatus as claimed in claim 1, wherein the material of the first flexible member comprises silicone rubber.

12. Apparatus as claimed in claim 1, further comprising a second flexible member arranged to thermally insulate the first flexible heater.

13. Apparatus as claimed in claim 1, further comprising a thermally conductive paint applied to a portion of the first flexible member, the thermally conductive paint being arranged to increase the thermal energy generated at the portion.

14. Apparatus as claimed in claim 1, wherein the first flexible heater is configured to emit infrared radiation having a wavelength band in the range of 780 nm to 1400 nm.

15. Apparatus as claimed in claim 1, wherein the article is an aerospace component.

16. A method of providing thermal energy to an article, the method comprising:
    providing an article;
    providing an apparatus, the apparatus comprising a first flexible heater configured to emit infrared radiation, wherein the first flexible heater includes a first flexible tube defining a cavity, and a first flexible elongate heater positioned within the cavity of the first flexible tube; and a first flexible member comprising a material, the first flexible member being configured to deform to substantially conform to the article, the material being configured to absorb the infrared radiation emitted by the first flexible heater and to generate thermal energy from the absorbed infrared radiation, the first flexible member being configured to transfer the generated thermal energy to the article through thermal conduction; and
    positioning the apparatus in contact with at least a part of the article to conductively transfer thermal energy to at least the part of the article.

17. The method as claimed in claim 16, further comprising:
    determining a heating profile for the apparatus to enable the apparatus to provide varying thermal energy across the part of the article.

18. The method as claimed in claim 16, further comprising:

performing a welding operation on a portion of the article prior to positioning the apparatus in contact with the article.

19. The method as claimed in claim 16, further comprising:

removing the apparatus from the article; and performing a welding operation on the article subsequent to removing the apparatus from the article.

\* \* \* \* \*